Sept. 20, 1955  E. J. JACQUES ET AL  2,718,428
AUTOMOBILE DOOR TRIM
Filed Dec. 27, 1952  3 Sheets-Sheet 1
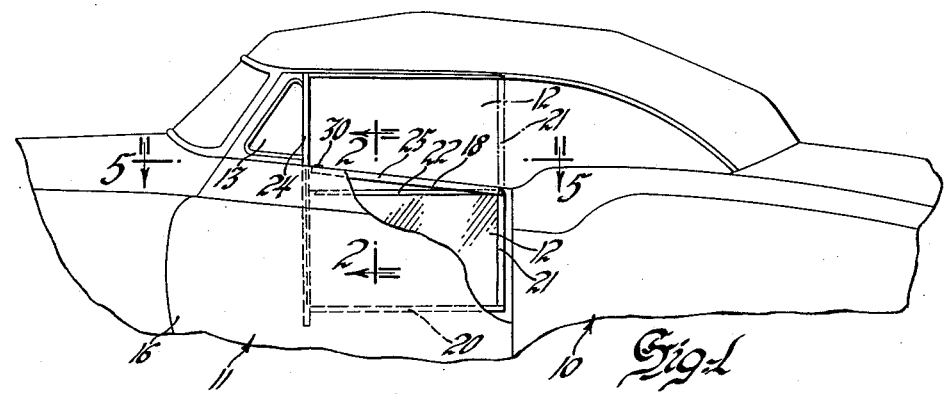
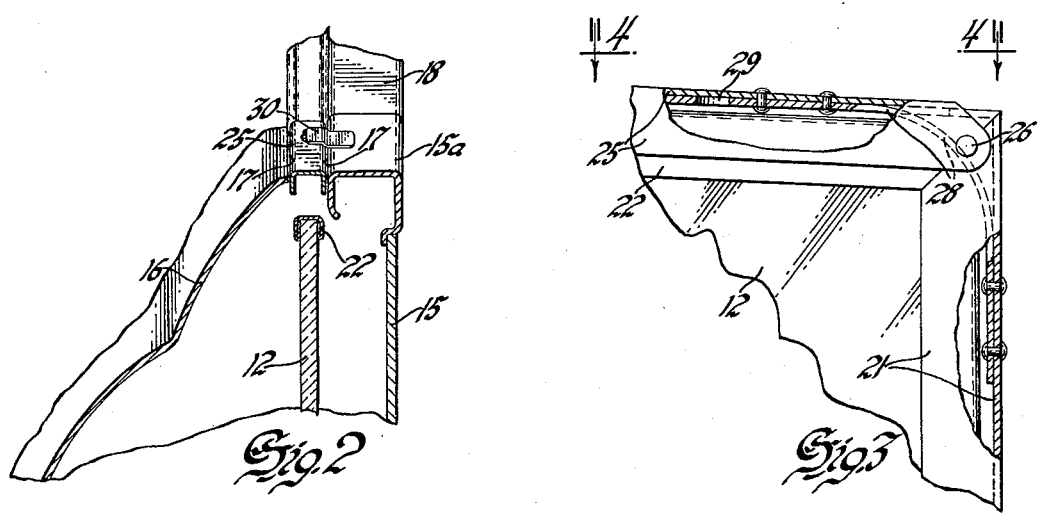
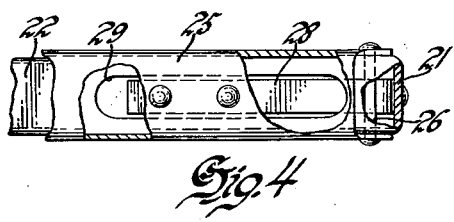
INVENTORS
Edward J. Jacques, &
BY Alfons O. Limberg
ATTORNEYS

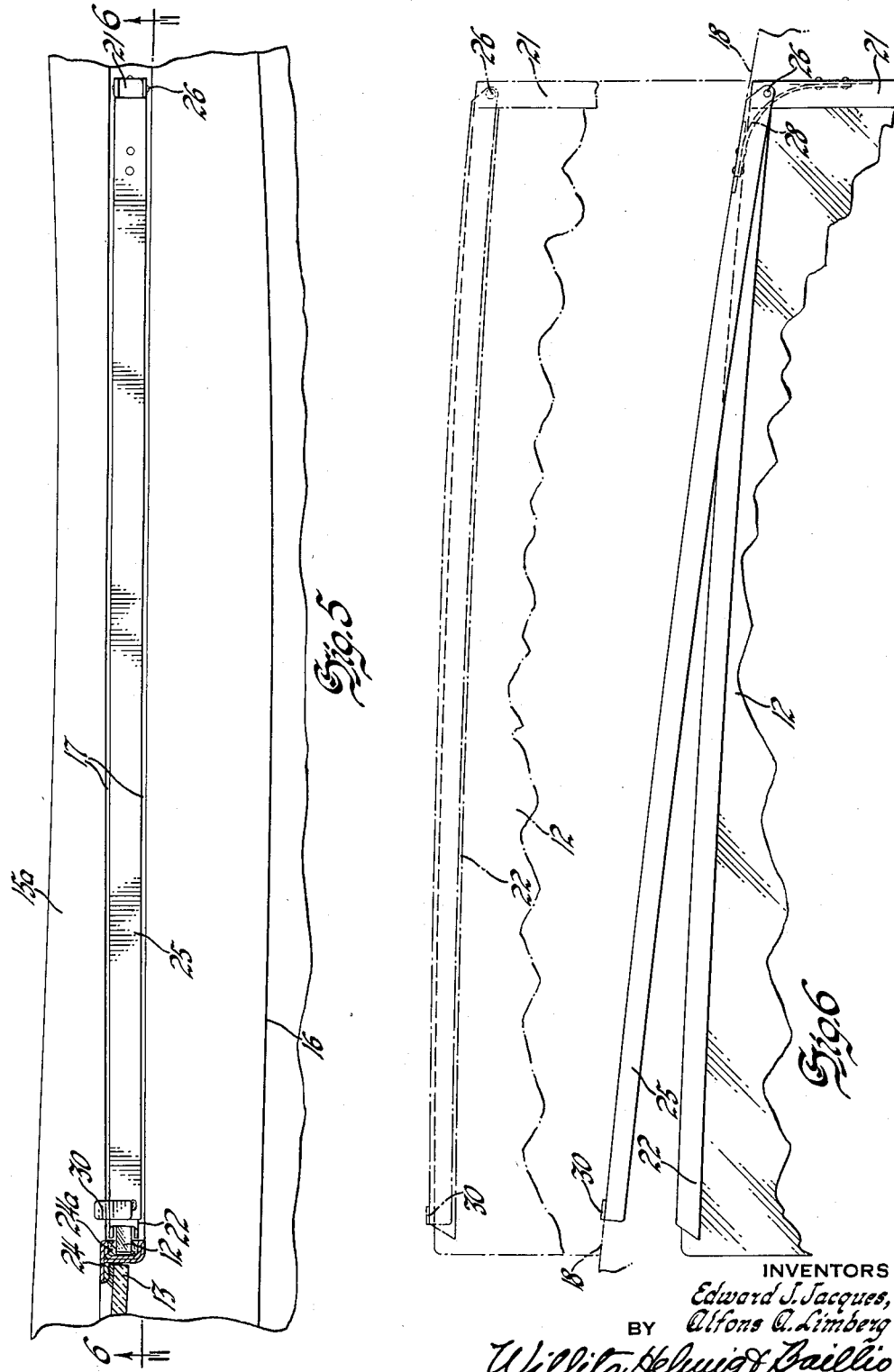

Sept. 20, 1955 E. J. JACQUES ET AL 2,718,428
AUTOMOBILE DOOR TRIM
Filed Dec. 27, 1952 3 Sheets-Sheet 3
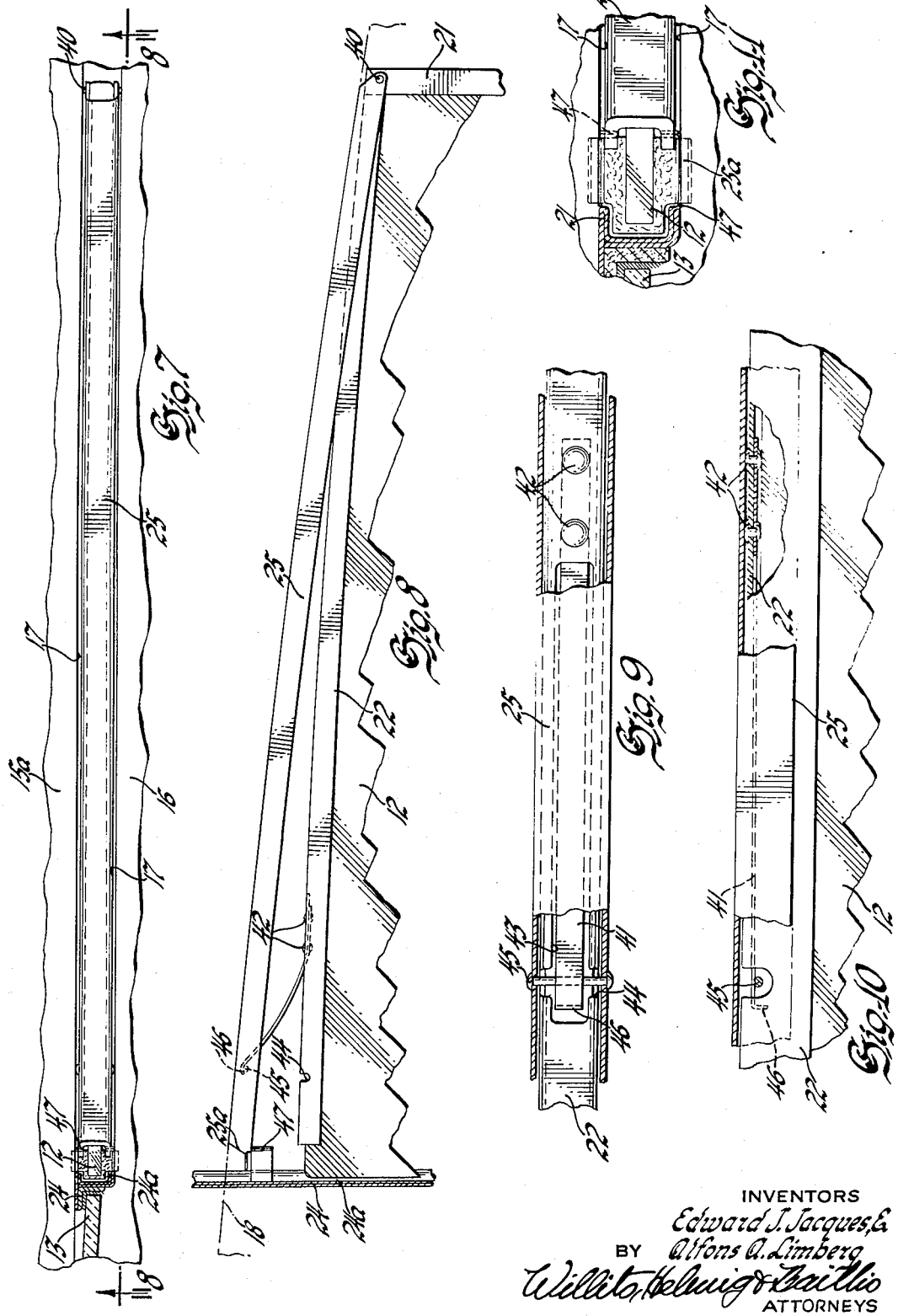
INVENTORS
Edward J. Jacques, &
BY Alfons A. Limberg
Willito Helwig & Baillio
ATTORNEYS

United States Patent Office 2,718,428
Patented Sept. 20, 1955

2,718,428

AUTOMOBILE DOOR TRIM

Edward J. Jacques, Utica, and Alfons A. Limberg, Grosse Pointe, Mich., assignors to General Motors Corporation, Detroit, Mich., a corporation of Delaware Application December 27, 1952, Serial No. 328,206

12 Claims. (Cl. 296—44)

This invention relates to automobile door trim, and more particularly to movable sash members for automobile windows.

Automobile doors are formed of spaced inner and outer panels, the upper edges of which define a portion of the automobile "belt line." The panels have a window-receiving slot or opening between their upper edges, and a window is mounted in the door for vertical movement through this opening between partially closed or closed positions, wherein the upper edge of the window is above the opening, and open position wherein the window is housed between said panels and most or all of the upper edge of said window is below the opening. Often, and particularly in sport models, the belt line slopes downwardly from front to rear of the car, and all of the upper edge of the window is below the belt line when the window is open so that there is an uncovered opening in the door which detracts from the appearance of the automobile and through which articles may fall to become lodged between the inner and outer door panels.

The invention provides a channel member which is hingedly mounted on the upper edge of the window and which is adapted to cover the opening through which the window descends when the window is open, thus improving the appearance of the automobile and preventing the loss of small articles through the opening, and preventing the possibility of jamming the window operating mechanism should articles fall through this opening. When the window is partially or entirely closed, the channel member rides on the upper edge of the glass, providing a protective and decorative sash.

Other features and advantages of the invention will be apparent from the following description and from the drawings, in which:

Fig. 1 is a fragmentary side elevational view of an automobile, the door window being shown in broken lines in closed position and in solid lines in open position and part of the door being broken away to show the window;

Fig. 2 is an enlarged section taken along the line 2—2 of Fig. 1, the window being shown open;

Fig. 3 is an enlarged detail side elevational view of the upper rear corner of the window, partly in section;

Fig. 4 is a top plan view of the apparatus of Fig. 3, partly in section;

Fig. 5 is an enlarged section taken along line 5—5 of Fig. 1 with the window open;

Fig. 6 is a section taken along the line 6—6 of Fig. 5, the window being shown in open position in solid lines and in partially closed position in broken lines;

Figure 7 is a view similar to Fig. 5, but showing a modified form of the invention;

Fig. 8 is a section taken along the line 8—8 of Fig. 7;

Fig. 9 is an enlarged fragmentary top plan view, partly in section, of a portion of the modified form of the invention;

Fig. 10 is a detail side view, partly in section, of the same; and

Fig. 11 is an enlarged detail view of a portion of Fig. 7.

Referring now more particularly to Figs. 1–6, of the drawings, an automobile 10 has a door designated generally as 11, provided with a vertically movable window 12 and a swingable cross ventilation window 13.

As shown best in Fig. 2, the door is formed of spaced inner and outer panels 15 and 16, the upper portion of the panel 15 being formed by a garnish molding strip 15a. The upper edge of the panels define a portion 18 of the automobile "belt line". An opening 17 for receiving the window is provided between the upper edges of the inner and outer door panels, and the window is vertically movable through this opening by means of any conventional operating mechanism (not shown) between open position shown in solid lines in Fig. 1 and shown fragmentarily in Figs. 2 and 6, wherein the upper edge of the window is below the level of the belt line 18 throughout substantially the entire length of the window, and the closed position shown in solid lines in Fig. 1 and shown fragmentarily in Fig. 6, wherein the upper edge of the window is above the level of the belt line 18. As shown in Figs. 1 and 6, the belt line 18 slopes downwardly from front to rear, while the upper edge of the window 12 extends substantially horizontally, so that when the window is open the rear end of the upper edge of the window is level with the opening 17, while the balance of the upper edge of the window is below the opening 17 and the window is housed entirely between the inner and outer door panels 15 and 16.

The window has a peripheral metal frame formed of a bottom channel member 20, a rear channel member 21 and a top channel member 22, the members 20, 21 and 22 being fixedly attached to the window. The front vertical edge of the window does not have a fixed frame channel, and the edge of the glass is guided in a channel 24a in the stationary frame 24 of the cross ventilation window 13 (see Fig. 5).

In order to cover the opening 17 when the window is open, a channel member 25 is movably mounted on the upper edge of the window and means are provided for preventing the channel member from passing through the opening 17 when the window is open.

The channel member 25 is hingedly mounted on the upper edge of the window 12 adjacent the rear end thereof by means of a pin 26. An L-shaped leaf spring 28 has one end riveted to the rear glass frame member 21 adjacent the top end thereof and the other end riveted to the channel member 25 adjacent the rear end thereof, said spring passing through a slot 29 (Fig. 4) in the top glass frame member 22. This spring urges the channel member 25 downwardly toward the top edge of the glass 12. Adjacent the front end of the member 25 a tab 30 is secured by welding or other means, this tab projecting inwardly from the member 25 and overlying the inner door panel garnish molding 15a. When the window is partially closed or fully closed, the channel 25 lies on the upper edge of the window and receives the member 22 within its arms, thus providing a decorative and protective strip. When the window is moved to open position wherein all but the rear end of the upper edge of the window is below the level of the opening 17, the tab 30 engages the garnish molding 15a and prevents the channel member 25 from passing through the opening 17. Since the transverse width of the member 25 is only slightly less than the width of the opening 17, the member 25 closes the opening, thus improving the appearance of the automobile and making it impossible for articles to fall through the opening 17.

Figs. 7 to 11 show a modification of the invention wherein the position of the spring is changed and the spring also serves as a guide to hold the channel member 25 in proper alignment with the upper edge of the window 12, and wherein a modified arrangement is provided for preventing the channel member 25 from passing through the opening 17 between the inner and outer door panels.

In Figs. 7 to 11 the channel member 25 is hingedly mounted at its rear end by a pin 40 in a manner similar to that shown in Fig. 6, but no spring is provided adjacent the hinge mounting. A spring 41 has its rear end secured to the under surface of the top window frame member 22 by means of rivets 42. The spring passes through a slot 43 in the frame member 22 and its forward end extends over a pin 45 which is mounted between the arms of the sash channel 25 beneath the spring. The forward end of the spring is bent downwardly at 46 to provide a hook adapted to engage pin 45 when the window is moved to open position. Engagement of hook 46 with pin 45 limits relative movement between the channel member 25 and the fixed frame member 22 and prevents the channel member 25 from being lifted up out of the opening 17 when the window is in open position. When the window is closed, the pin 45 enters a slot 44 in the member 22.

Instead of a tab as shown at 30 in Figs. 1, 2, 5 and 6 to support the channel member 25 at the belt line, the modified form of the invention utilizes rubber covered tabs 47 (Fig. 11) on the cross ventilation window frame 24 adjacent the bottom end thereof just below the belt line 18. When the window descends, the front lower corner 25a (Fig. 8) of the channel member 25 engages and rests upon the tabs 47 so that the channel member is prevented from passing through the opening 17.

While we have shown and described several embodiments of our invention, it is capable of many modifications. Changes, therefore, in the construction and arrangement may be made without departing from the spirit and scope of the invention as set forth in the appended claims.

We claim:

1. Apparatus of the character described, including: a door having spaced inner and outer panels providing a window-receiving opening between their edges; a window mounted on said door for movement through said opening between closed position wherein an edge of the window is out of said opening and open position between said panels, wherein at least a portion of said edge of the window is within said opening; and a cover member swingably mounted on said edge of the window and adapted to close at least a portion of said opening when the window is open said cover member being movable in the direction of window closing movement relative to said edge of the window.

2. Apparatus of the character described, including: a door having spaced inner and outer panels providing a window-receiving opening between their edges; a window mounted on said door for movement through said opening between closed position wherein an edge of the window is out of said opening and open position between said panels, wherein at least a portion of said edge of the window is within said opening; a cover member swingably mounted on said edge of the window and adapted to close at least a portion of said opening when the window is open, said cover member being movable in the direction of window closing movement relative to said edge of the window; the transverse width of said cover being slightly less than the width of said opening; and spring means urging said cover member toward said window edge.

3. Apparatus of the character described, including: a door having spaced inner and outer panels providing a window-receiving opening between their upper edges; a window mounted on said door for movement through said opening between closed position wherein the upper edge of said window is above said opening and open position between said panels, wherein at least a portion of the upper edge of the window is below said opening; a channel member hingedly mounted on said window for swingable movement relative to the upper edge thereof; and means for preventing said channel member from passing through said opening when the window is open.

4. Apparatus of the character claimed in claim 3, wherein the transverse width of said channel member is slightly less than the width of said opening, and wherein said last mentioned means hold said channel member substantially flush with the upper edges of said panels.

5. An automobile window sash channel assembly of the character described, including: a door having spaced inner and outer panels providing a window-receiving opening between their upper edges; a window mounted on said door for movement through said opening between closed position wherein the upper edge of said window is above said opening and open position between said panels, wherein at least a portion of the upper edge of the window is below said opening; a channel member hingedly mounted on said window for swingable movement relative to the upper edge thereof and adapted to close said opening when the window is open, the width of said channel member being slightly less than the width of said opening; means for preventing said channel member from passing through said opening when the window is open; and spring means urging said channel member toward the upper edge of said window.

6. Apparatus of the character claimed in claim 5, wherein the upper edge of said window extends substantially horizontally and the upper edges of said door panels slope downwardly from one end to the other.

7. Apparatus of the character claimed in claim 5, wherein the upper edge of said window extends substantially horizontally and the upper edges of said door panels slope downwardly from front to rear, and said channel member is hingedly mounted adjacent its rear end about a transverse axis adjacent an end of said upper edge.

8. Apparatus of the character claimed in claim 5, wherein the means for preventing the channel member from passing through the opening comprises a tab mounted on said channel member and extending beyond the edge of said opening, said tab being adapted to engage the upper edge of one of said panels when the window is open.

9. An automobile window sash channel assembly of the character described, including: a door having spaced inner and outer panels providing a window-receiving opening between their upper edges; a window mounted on said door for movement through said opening between closed position wherein the upper edge of said window is above said opening and open position between said panels, wherein at least a portion of the upper edge of the window is below said opening; a stationary frame for guiding the edge of said window above said opening; a channel member hingedly mounted on said window for swingable movement relative to the upper edge thereof and adapted to close said opening when the window is open, the width of said channel member being slightly less than the width of said opening; means on said frame adapted to engage said channel member for preventing said channel member from passing through said opening when the window is open; and spring means urging said channel member toward the upper edge of said window.

10. An automobile window sash channel assembly of the character described, including: a door having spaced inner and outer panels providing a window-receiving opening between their upper edges, said upper edges sloping downwardly from front to rear; a window mounted on said door for movement through said opening between closed position wherein the upper edge of said window is above said opening and open position between said panels, wherein at least a portion of the upper edge of the window is below said opening; the upper edge of said window extending substantially horizontally and having its rear end substantially level with said opening when the window is open; a window frame fixedly mounted around at least a portion of the periphery of said window; a channel member hingedly mounted about a transverse axis adjacent the rear end of the upper edge of said window and extending along the upper edge of said window to adjacent the front end thereof, the width of the channel member being slightly less than the width of said opening, and said channel member being adapted to close said opening when the window is open; means operative upon the front end of said channel member for preventing said channel member from passing through said opening when the window is open; and spring means urging said channel member toward the upper edge of said window.

11. In an automobile having a door with spaced inner and outer panels providing a window-receiving opening between their upper edges and a window mounted on said door for movement through said opening between closed position wherein the upper edge of said window is above said opening and open position between said panels wherein at least a portion of the upper edge of the window is below said opening, a window sash channel of the character described, including: a channel member hingedly mounted on said window for swingable movement relative to the upper edge thereof; and means for preventing said channel member from passing through said opening when the window is open.

12. In an automobile having a door with spaced inner and outer panels providing a window-receiving opening between their upper edges and a window mounted on said door for movement through said opening between closed position wherein the upper edge of said window is above said opening and open position between said panels wherein at least a portion of the upper edge of the window is below said opening, a window sash channel of the character described, including: a channel member hingedly mounted on said window for swingable movement relative to the upper edge thereof; means for preventing said channel member from passing through said opening when the window is open; and spring means urging said channel toward the upper edge of said window.

References Cited in the file of this patent
UNITED STATES PATENTS

| | | |
|---|---|---|
| 275,398 | Lowa | Apr. 10, 1883 |
| 1,375,914 | Kimbark | Apr. 26, 1921 |
| 1,873,190 | Doller | Aug. 23, 1932 |
| 1,874,717 | Sullivan | Aug. 30, 1932 |
| 2,206,334 | Rosner | July 2, 1940 |
| 2,586,631 | Esch | Feb. 19, 1952 |